United States Patent
Bernard et al.

(10) Patent No.: US 7,174,377 B2
(45) Date of Patent: Feb. 6, 2007

(54) METHOD AND APPARATUS FOR COLLABORATIVE DOCUMENT VERSIONING OF NETWORKED DOCUMENTS

(75) Inventors: Pierre G. Bernard, Luxembourg (LU); Natalie S. Glance, Pittsburgh, PA (US); Jean-Luc Meunier, Saint Nazaire les Eymes (FR)

(73) Assignee: Xerox Corporation, Stamford, CT (US)

( * ) Notice: Subject to any disclaimer, the term of this patent is extended or adjusted under 35 U.S.C. 154(b) by 711 days.

(21) Appl. No.: 10/046,481

(22) Filed: Jan. 16, 2002

(65) Prior Publication Data

US 2003/0135607 A1    Jul. 17, 2003

(51) Int. Cl.
*G06F 15/173* (2006.01)

(52) U.S. Cl. ............... 709/224; 709/203; 709/223; 709/245; 707/200; 707/203; 707/204; 713/200

(58) Field of Classification Search ............... 709/223, 709/224, 226, 203, 218, 219, 246, 204; 713/200; 703/201; 707/100, 200, 203, 204
See application file for complete search history.

(56) References Cited

U.S. PATENT DOCUMENTS

| | | | | |
|---|---|---|---|---|
| 4,996,642 A * | 2/1991 | Hey | ............... | 705/27 |
| 5,813,007 A * | 9/1998 | Nielsen | ............... | 707/10 |
| 5,890,176 A * | 3/1999 | Kish et al. | ............... | 715/511 |
| 5,898,836 A * | 4/1999 | Freivald et al. | ............... | 709/218 |
| 6,029,175 A * | 2/2000 | Chow et al. | ............... | 707/104.1 |
| 6,047,327 A * | 4/2000 | Tso et al. | ............... | 709/232 |
| 6,055,570 A * | 4/2000 | Nielsen | ............... | 709/224 |
| 6,098,064 A * | 8/2000 | Pirolli et al. | ............... | 707/2 |
| 6,219,818 B1 * | 4/2001 | Freivald et al. | ............... | 714/799 |
| 6,249,795 B1 * | 6/2001 | Douglis | ............... | 715/511 |
| 6,266,649 B1 * | 7/2001 | Linden et al. | ............... | 705/26 |

(Continued)

FOREIGN PATENT DOCUMENTS

EP    1 050 831 A2    11/2000

(Continued)

OTHER PUBLICATIONS

Ackerman, M., Starr, B., Pazzani, M., "The Do-I-Care Agent: Effective Social Discovery and Filtering on the Web." Proceedings of RIAO'97, 17-31, 1997.

(Continued)

*Primary Examiner*—Saleh Najjar
*Assistant Examiner*—Shawki Ismail
(74) *Attorney, Agent, or Firm*—Oliff & Berridge, PLC; Eugene Palazzo

(57) ABSTRACT

The system comprises an improved document monitoring agent in which user evaluations are used to decide whether a changed document should be saved in the system or not. The evaluation of importance of the change in a document is performed by one or more users who collaboratively monitor a networked document, typically identified by a URL. By providing a user evaluation interface, it is possible for users to indicate their evaluation of the significance of the change. As such, only significantly changed documents, as indicated by the users themselves, are saved. Thus, a more efficient saving is obtained while at the same time reducing the risk of discarding potentially interesting changed documents which would have been discarded by conventional monitoring agents.

17 Claims, 6 Drawing Sheets

U.S. PATENT DOCUMENTS

| | | | |
|---|---|---|---|
| 6,266,683 B1 * | 7/2001 | Yehuda et al. | 715/512 |
| 6,366,933 B1 * | 4/2002 | Ball et al. | 715/511 |
| 6,415,368 B1 * | 7/2002 | Glance et al. | 711/158 |
| 6,569,030 B1 * | 5/2003 | Hamilton | 473/257 |
| 6,681,369 B2 * | 1/2004 | Meunier et al. | 715/511 |
| 6,763,388 B1 * | 7/2004 | Tsimelzon | 709/228 |
| 6,834,306 B1 * | 12/2004 | Tsimelzon | 709/228 |

FOREIGN PATENT DOCUMENTS

| | | | |
|---|---|---|---|
| EP | 1050831 | * | 11/2000 |
| EP | 111517 | * | 6/2001 |

OTHER PUBLICATIONS

Dedieu, Olivier, "Pluxy : un proxy Web dynamiquement extensible", in proceedings of the NoTeRe '98 colloquium, Oct. 1998 (in French with an abstract in English).

Douglis, F., Ball, T., Chen, Y.F., Koutsofios, E., "The AT&T Internet Difference Engine: Tracking and Viewing Changes on the Web," in World Wide Web, 1(1), 27-44, Jan. 1998.

Fishkin, K., Bier, E., "WebTracker—a Web Service for tracking documents," in Proceedings of World Web 6, Santa Clara, California, 1997.

Glance, N., Arregui, D. and Dardenne M., "Knowledge Pump: Supporting the Flow and Use of Knowledge," in Information Technology for Knowledge Management. Eds. U. Borghoff and R. Pareschi, New York: Springer-Verlag, 1998.

Glance et al., "Collaborative Document Monitoring", in Proceedings of GROUP2001, Boulder, Colorado, ACM Press, Oct. 2001.

Glance et al. "Collaborative Document Monitoring via a Recommender System", in: Agents-2000 Workshop on Agent-based Recommender Systems (WARS), Barcelon, Spain, Jun. 2000.

Glance, N., Arregui, D. and Dardenne M., "Making recommender systems work for organizations," in Proceedings of PAAM99 (London, UK, Apr. 1999), 1999.

Grasso et al., "Augmenting Recommender Systems by Embedding Interfaces into Office Practices" In: Proceedings of HICSS-33, Jan. 4-7, 2000, Island of Maui, Ha., U.S.A.

Kenichi Kamiya, Martin Röscheisen, and Terry Winograd, "Grassroots: A System Providing a Uniform Framework for Communicating, Structuring, Sharing Information, and Organizing People", Technical Report, Computer Science Department, Stanford University, Dec. 1995, available on the Internet at http://www-pcd.stanford.edu/Grassroots.

Muslea, I. "Extraction Patterns for Information Extraction Tasks: A Survey," in Proceedings of AAAI'99 Workshop on Machine Learning for Information Extraction, Orlando, Florida, Jul. 1999.

"Webmaster: Advanced Features Guide", NetMind, available on the Internet on Nov. 14, 2001 at http://www.netmind.com/members/admin_central.shtml.

"Webmaster Program", NetMind, available on the Internet on Nov. 14, 2001 at http://www.netmind.com/members/webmaster_program.shtml.

Resnick, P., Iacovou, N., Suchak, M., Bergstrom, P. and Riedl, J. "GroupLens: An open architecture for collaborative filtering of netnews," in Proceedings of CSCW'94 (Chapel Hill, NC, Oct. 1994), ACM Press, 175-186 (Available on the Internet at: http://www.si.umich.edu/~presnick/papers/cscw94/GroupLens.htm).

Yvonne Koulouthros, PC Magazine, "First Floor Inc.: Smart Bookmarks" Apr. 8, 1997, available on the Internet at http://www.zdnet.com/products/content/pcmg/1607/pcmg0106.html.

"Making Search Sticky" in The Search Engine Report, Apr. 2000, available on the Internet at http://searchenginewatch.com/sereport/00/04-sticky.html.

"Getting Started with SurfBot 3.0", Surflogic LLC., http://www.surflogic.com/, available on the Internet on Nov. 14, 2001 at http://www.surflogic.com/sb30docs/sbhelp2.htm.

WebSpector (TM) "Automatically monitor an unlimited number of web pages for content changes" from Illumix Software (TM), available on the Internet on Nov. 14, 2001 at http://www.illumix.com/webspector/htm#description.

* cited by examiner

METHOD AND APPARATUS FOR COLLABORATIVE DOCUMENT VERSIONING OF NETWORKED DOCUMENTS

BACKGROUND OF THE INVENTION

The present invention relates to the field of information retrieval, and in particular to the field of providing document change information of networked documents using document monitoring agents.

Changes to such documents are of interest to users. Such changes can take many forms: substantive content change, cosmetic/syntactic changes, and disappearance of the document. In addition, administrators of data stores containing document references face the additional problem that the same document can be referenced by multiple references.

Some databases are equipped with tools, using triggers that help users deal with these problems by notifying users when referenced items of interest change in some way or are removed. On the World Wide Web, hereafter referred to as the Web, there are also several services available that help users monitor Web pages based on their Uniform Resource Locator (URL) address, such as:

Netmind: http://www.netmind.com.

Generally, these services, which are called document monitoring agents, notify users when URLs they have registered with the service have changed in some way. Users can request to be alerted daily/weekly, etc. Current monitoring services save either (1) a reference copy of the document, which is updated periodically (e.g. daily); (2) a summary of the change; or (3) a complete version history for the document.

Saving a complete version history allows the service to highlight to the user all changes since a given date by computing the difference in the current version and a previous version (for example, the version last viewed by the user). This is a powerful feature, but very costly. On the other hand, saving only one reference version means that a user needs to view the changes each time she or he is notified or else miss them.

Thus, evaluating the nature of the change and its importance for the user is a difficult task to automate and is thus the weakness of such change monitoring systems. The agent notifications, while perhaps including a great deal of data concerning the change, may be potentially irrelevant to the user, and in the long run, the high noise versus signal ratio may cause the user more annoyance than aid.

Saving a revision history containing text/visual summaries of changes from version to version is a good compromise. For example, Webspector™ from Illumix (http://www.illumix.com/) is such an application that can provide a list of changes of retrieved documents, an example of a retrieved documents list is shown in FIG. 1. For each document, a revision history (report) can be shown. Furthermore, each modified page can be checked and the program by default highlights text that has changed within each page or allows for keywords to be entered by a user and indicates any changes on a page thereby highlighting the keyword.

Since a user does not always want to be notified of every single change, Webspector further provides a possibility to limit downloads so as to reduce the possibility of being notified of a page change due to a rotating advertisement. For example, if a size-parameter '400' is entered by the user in a Size Threshold field, this means that if the page is less than 400 bytes bigger or smaller than the previous version, Webspector will not recognize the page as having been modified. Further, to avoid excessive clutter, it is possible to specify that Webspector only keep the latest version of a particular page.

However, many of the changes detected are spurious from the user's point of view. Thus, a non-trivial problem faced by URL monitoring systems is how to maintain a revision history for monitored URLs that tracks only changes significant to subscribers and filters out automatically detected changes that are of no interest.

In addition, within a given workgroup, work community, or organization, it is likely that the existence of substantive changes in a document will be relevant to a number of people, not just one. In this case, the work of evaluating the nature of the change is likely to be done not once but many times, as there is currently no good way to share this work.

SUMMARY OF THE INVENTION

It would therefore be advantageous to provide a system having a document monitoring agent that saves a record of all document versions that correspond to "important" or "significant" changes to networked documents, as evaluated by users. Using such a system, the evaluation of importance can be performed by a user or a group of users who collaboratively monitor a URL. In addition, the evaluation can be used in order to decide when there is a substantively new version of the document that needs to be saved in the system. It would also be advantageous to provide a method for allowing users to explicitly evaluate the significance of a change in order to decide on saving the changed document or not.

In accordance with one aspect of the invention, there is provided a system for providing document change information to at least one user and for saving a changed document. The system includes document representation storage for storing representations of saved changed documents. A document registration element enables a user to identify documents for which they would like to be notified of changes. A document change monitoring element is coupled to the document registration element. The document change monitoring element detects a change to the document. A user notification element is coupled to the document change monitoring element. The user notification element notifies users of the change. The system includes a user evaluation interface for enabling a user to indicate the significance of the notified change. The system is arranged to store a copy of the changed document in the document representation storage as a function of the user's indication of significance.

In accordance with another aspect of the invention, there is provided a method for storing in a system a changed document in network-accessible documents, accessible to users of the system. The system includes a network for accessing a set of network-accessible documents and user notification data that indicates, for each of a subset of the network-accessible documents, one or more users to be notified when a change in the network-accessible document is detected. The method includes: using the network to automatically attempt to access one of the network-accessible documents in the subset and to detect whether the accessed document has changed or not; automatically notifying users indicated for the network-accessible document by the user notification data that the network-accessible document is changed; receiving an evaluation of the changed network-accessible document from each notified user, each user providing an evaluation value selectable from a plurality of predetermined values; and in response to the received evaluation, deciding whether the changed document should be stored in the system.

Advantageously using the present invention, it is possible to take into consideration user evaluations which are then used in order to determine when there is a substantively new version of a document and to decide whether this new version should be saved or not.

BRIEF DESCRIPTION OF THE DRAWINGS

Other features and advantages of the present invention will become clear from reading the following description, which is given solely by way of a non-limitative example thereby referring to the attached drawings in which.

DETAILED DESCRIPTION

A document change monitoring agent, as described in detail below, is responsible for tracking changes in referenced documents. Such changes may be related to content change of the document, broken links (e.g. an incorrect URL) or relocation (e.g. a different URL). Its main components, with respect to the present invention, are data storage for storing representations of the document content and a function for evaluating the extent and character of the change of the content. As mentioned above, such document change monitoring agents already exist on the Web and have also been instantiated as triggers within databases. According to the present invention, user evaluations means for allowing users to evaluate the changes and means to share this information with other users are added to the known document change monitoring agent.

The general principle of a known document change monitoring agent is described in detail hereafter followed by a detailed discussion of the enhanced monitoring agent of the present invention and the manner for coupling a user evaluation means to such a change monitoring agent in order to resolve the problems discussed above.

Figure 1:
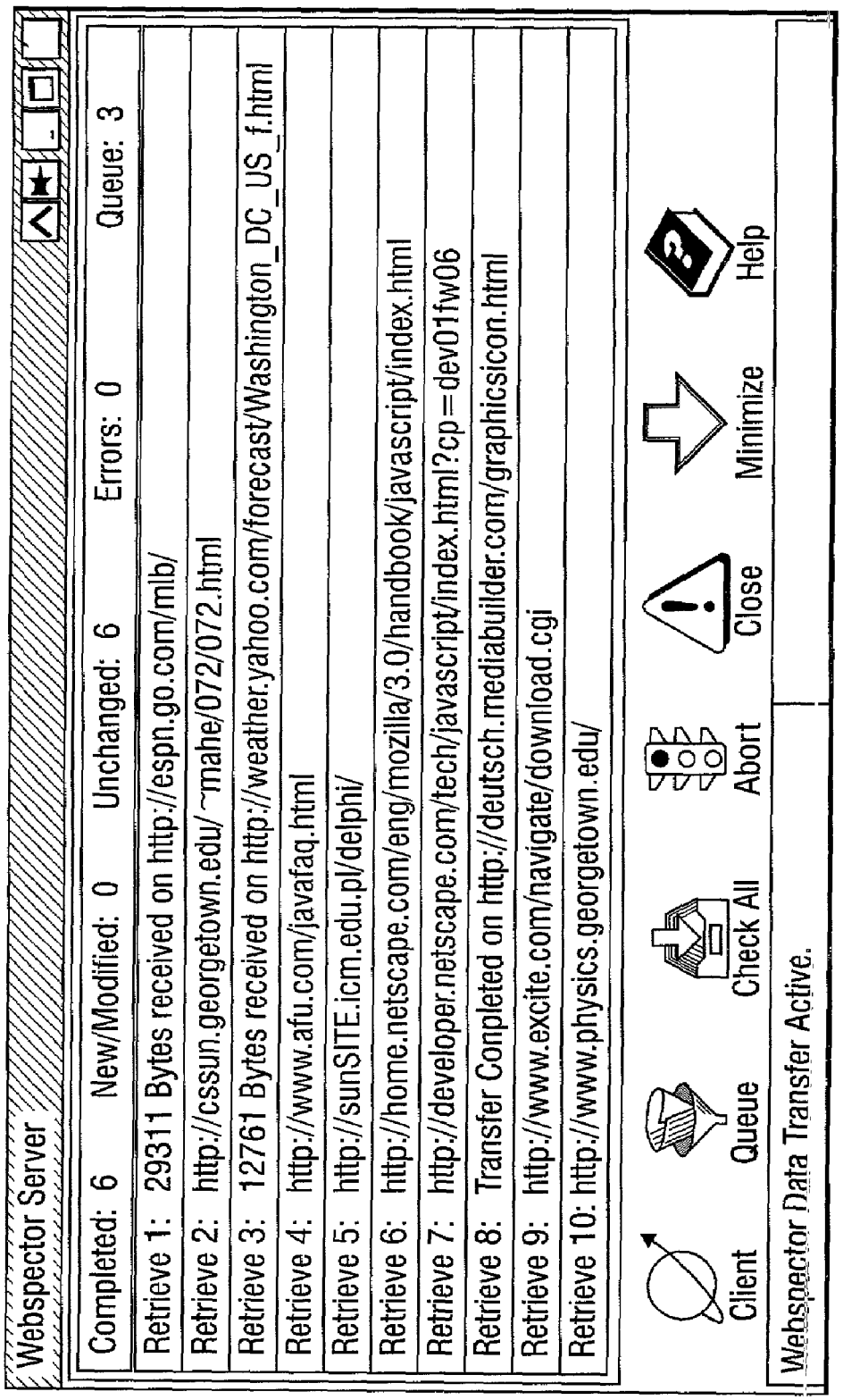
FIG. 1, already mentioned, shows an example of a list of retrieved changed documents presented by a conventional monitoring agent.
Figure 2:
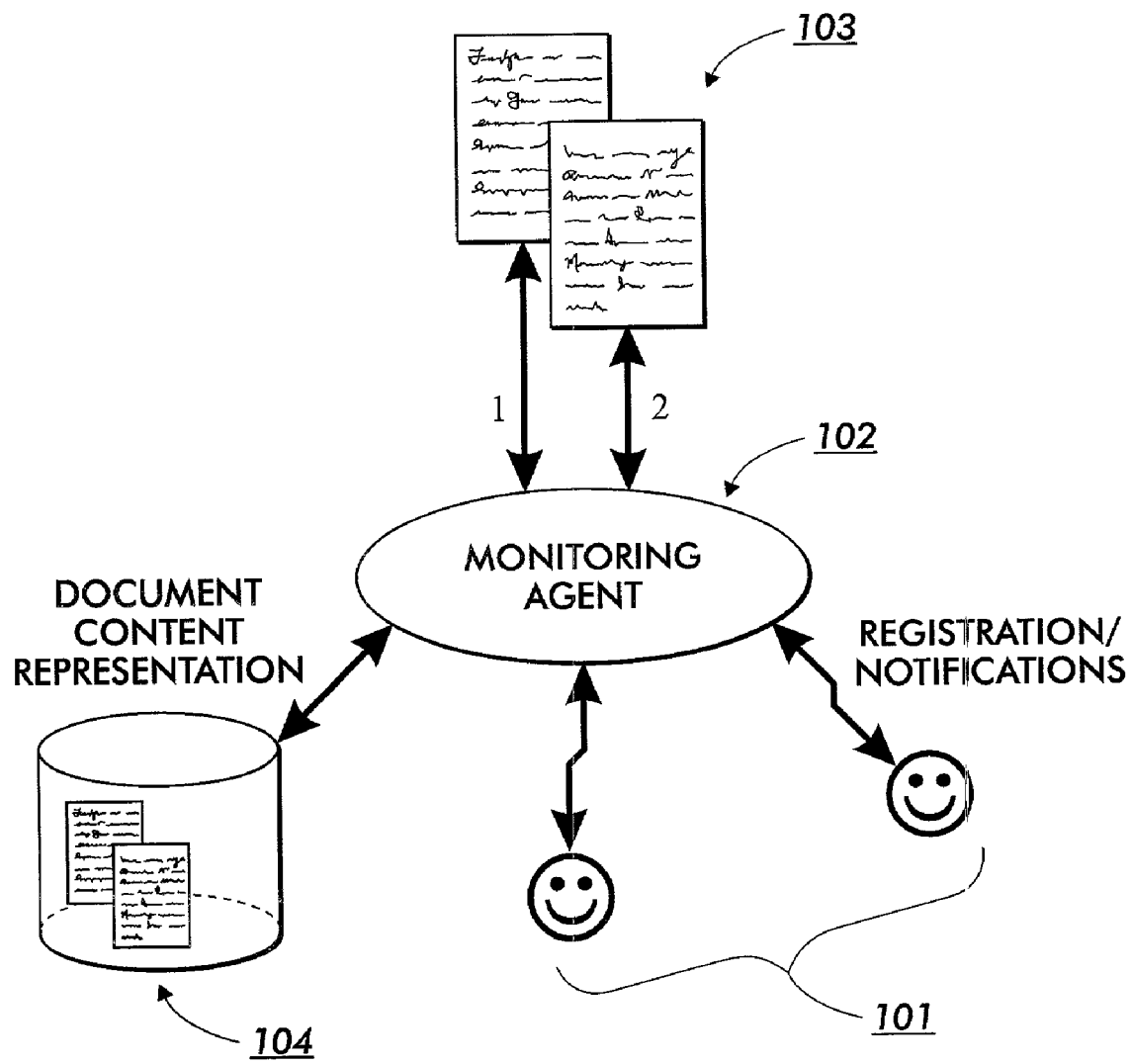
FIG. 2 represents schematically a block diagram of a conventional document change monitoring agent.

FIG. 2 represents schematically a block diagram of a conventional document change monitoring agent. Generally, a document change monitoring agent provides a means to track changes in online documents and to notify interested people about the change. Document monitoring involves three steps which are illustrated with reference to FIG. 2.

Step 1: User Document Registration and Interest Specification;

A user 101 registers with monitoring agent 102 the identifier of an online document 103 (for monitoring agents operating on the Web, this is typically the URL of the document). Additionally, some agents permit the definition of: i) a region to monitor in the document, ii) a list of keywords that represent the user interest, iii) the periodicity of the check the agent will perform, or iv) the kind of change to look for, e.g. textual, hyperlinks, image changes etc.

Step 2: Monitoring Agent Monitors Document(s);

The monitoring agent 102 monitors document changes by periodically accessing the document. In this case, the monitoring agent 102 is responsible for detecting the change and therefore associates with the document identifier a record of information representing the state of the document. Such information is stored in document content representation storage 104. The monitoring agent 102 detects changes by comparing successive records. The information recorded may range from the whole document content to a document content checksum of only a few bytes. The relevance and efficiency of the change detection derives directly from the sort of record(s) (or combination thereof) that is used.

Step 3: Monitoring Agent Notification To User;

Monitoring agent 102 notifies the user 101 about the change, typically by sending an email describing the detected change. Here again, the description of the change can range from a detailed textual comparison to an almost empty message notifying the occurrence of the change, depending on which kind of records were kept for the document.

Thus a changed document will be temporarily cached in the system so as to allow a user to monitor it. However, after monitoring, it should be decided if the document is to be actually stored in the system or not.

For each document being monitored, there may be a potentially large number of users being alerted regarding changes.

Figure 3:
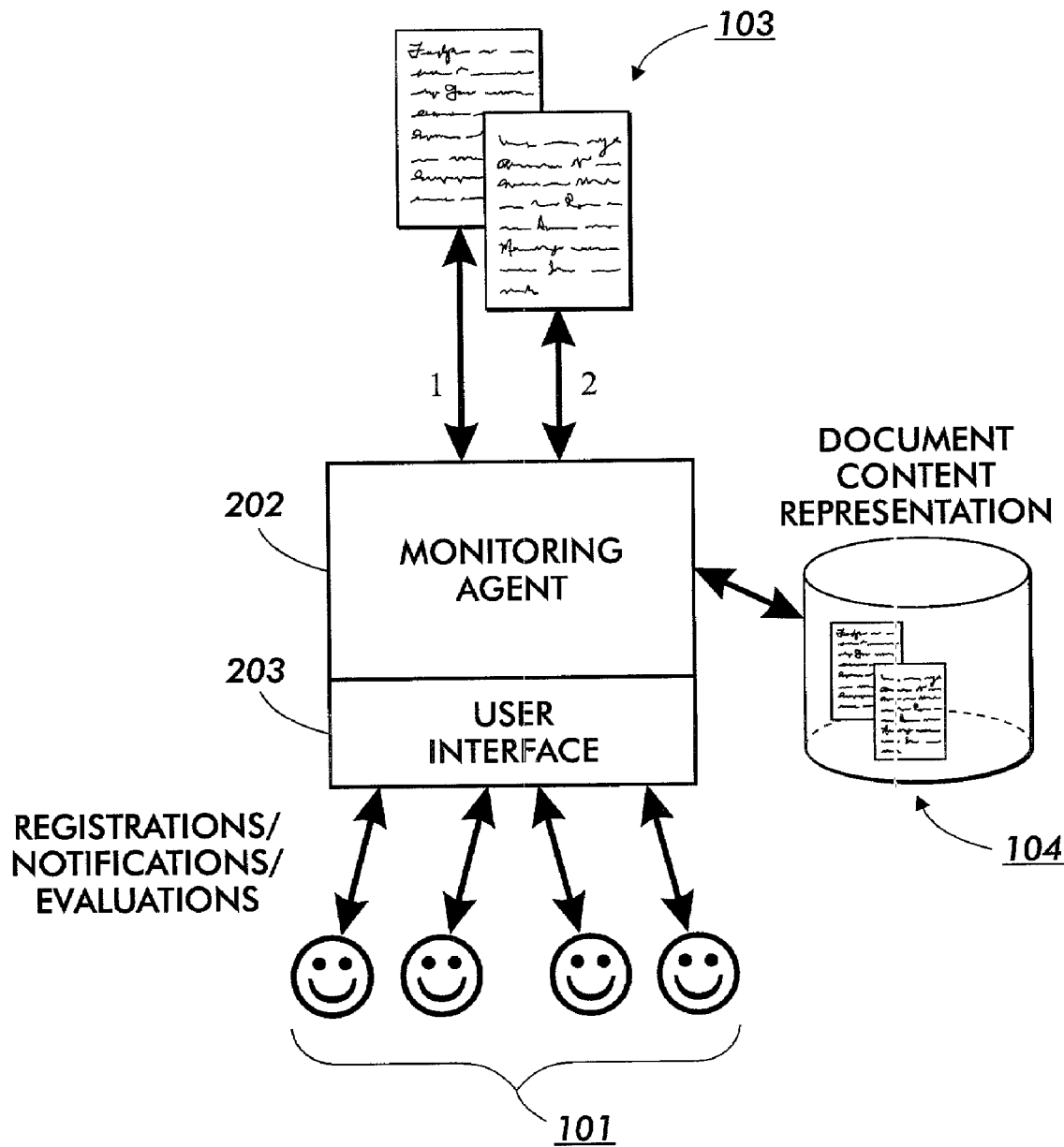
FIG. 3 represents schematically a block diagram of a document change monitoring agent according to the present invention.

According to the present invention, the user feedback is taken into consideration for the document monitoring agent to decide whether the changed document should be saved, i.e. moved from the temporary cache to the system storage or not. Thus, users provide feedback as to the importance of the change (e.g. minor, significant, important). To this effect, the monitoring agent is further provided with user evaluation means which is an interface allowing users to input their feedback. An example of a block diagram representing the document monitoring agent according to the present invention is shown in FIG. 3. Similar features as in FIG. 2 are indicated by similar reference numerals and will not be further explained here. Thus, the present monitoring agent 202 is coupled to a user evaluation means 203. The monitoring agent may also fully incorporate the user evaluation means, e.g. as an instruction set programmed in software creating the user interface and capable of interpreting feedback, i.e. evaluations entered by a user 101. Naturally, this feedback could be merely a limited choice of evaluation options, or it could be more elaborate. In a simple version, a user inputs his evaluation in a field provided to this effect, and which may be programmed accordingly. User interfaces for providing feedback are known as such in the art, and thus could be implemented using such known technology. An example of such implementation will be described in detail hereafter.

By combining the evaluation of all users, i.e. by using a collaborative judgment, a more relevant evaluation can be obtained. The collaborative judgment of the users may be calculated using some function of their individual evaluations or judgments, for example, by taking the maximum; by taking a weighted sum of the individual judgments; or by using collaborative filtering techniques. When the collaborative judgment is greater than some predetermined threshold, the monitoring agent saves a reference copy of the detected changed document.

Other parameters which may be taken into consideration to limit the number of documents to be cached may be the total number of reference versions to keep per document, or the number of copies to keep, such as all the copies for a week to provide time for users to evaluate the nature of the change.

Although the present invention applies to document monitoring agents in general, it is also possible to use the principal aspect of the user evaluation interface for providing feedback so as to decide on saving in a recommender system.

Recommender systems are able to provide personalized recommendations that take into account similarities between people based on their user profiles. An example of a recommender system is known from the Alexa Internet site (URL: http://www.alexa.com). Such system provides a list of recommended web pages worth viewing based on some predetermined filtering criteria. Thus, a recommender system is an intelligent agent that provides a way to filter items by personalized measures of quality. Since measuring quality is highly subjective, it may be more accurate to say that recommender systems work by filtering a taste. Recommender systems learn their users' tastes and recommend items to users by first matching users to each other by way of user profiles. Clearly, there still remains a potential problem of whether the recommended, i.e. filtered documents presented to a user is indeed of interest or not.

Alternatively, it is even possible to combine recommender systems with monitoring agents as described, e.g. in the document EP-A-1 050 831, in the name of the present assignee, and thus also with the present agent.

A known recommender system, which is used internally by the assignee, is called the Knowledge Pump (or KP). An illustrative implementation of the present inventive monitoring agent with user evaluation means into the Knowledge Pump will be described hereafter.

First, a short explanation of Knowledge Pump will be given. Knowledge Pump provides users with personalized recommendations for things to read. When users sign up, they join communities of people with similar interests. Profiler agents track and map each user's interests, learning more about the person each time (s)he uses KP. A recommender agent finds matches between new items and user preferences, automatically sending relevant and high quality information to people as it is found.

Knowledge Pump consists of a set of agents providing on-line support for existing intranet-based and extranet-based communities. The Knowledge Pump channels the flow and use of knowledge in an organization, connecting document repositories, people and processes, and leveraging formal and informal organizational charts and structure. In particular, the main objective of the Knowledge Pump is to help communities, defined by their common interests and practices, more effectively and more efficiently share knowledge, be it in the form of must-read documents or new ways to get work done.

The core of the Knowledge Pump is the recommendation functionality that is based on community-centered collaborative filtering which filters both by content and by taste. KP handles content filtering by relying on recommenders to classify items into pre-defined communities. Social filtering matching items to people by first matching people to each other is accomplished using statistical algorithms and profiles of a collection of users. For more information about the Xerox Knowledge Pump, reference is made to the article "Making Recommender Systems Work for Organizations" by Natalie S. Glance, Damián Arregui and Manfred Dardenne, Proceedings of PAAM 1999.

Figure 4:
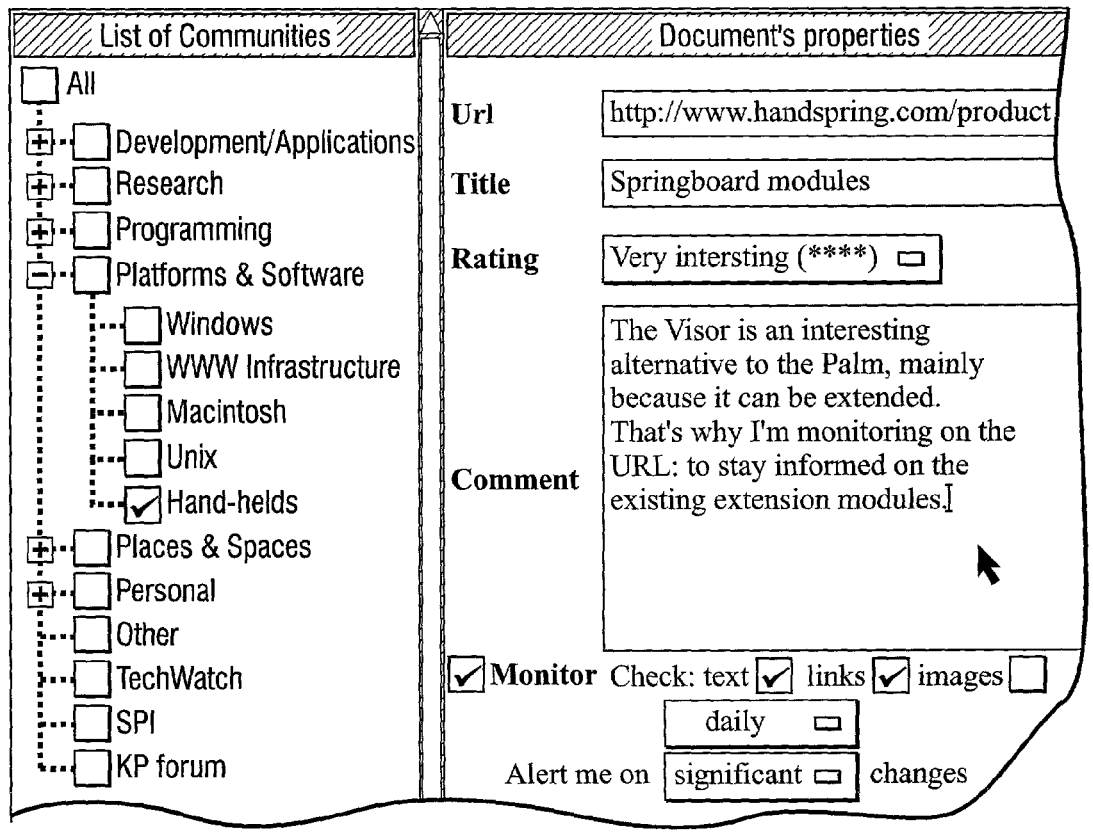
FIG. 4 shows an example of an interface used in a conventional recommender system called the Knowledge Pump allowing a user to request the monitoring of a URL.

As shown in FIG. 4, members of Knowledge Pump (KP) can request to monitor a URL when reviewing a KP document. Thus, this corresponds to step 1 as described with respect to FIG. 2 above. Following this, the monitoring agent, i.e. Knowledge Pump monitors the pages as explained in step 2 above. All members monitoring a page are alerted when the page has changed, by e-mail and via the KP interface. This corresponds to step 3 above. KP provides a software evaluation of the extent of the change: textual change, link changes, and image changes.

Members can then view the changed document that is temporarily cached, which is rendered by KP so as to highlight the differences since the user last viewed the document (via KP). Thus, the user can then provide his opinion of the content of the document allowing the other users the possibility of relying on this opinion so as to read the new version of the document or not.

Figure 5:
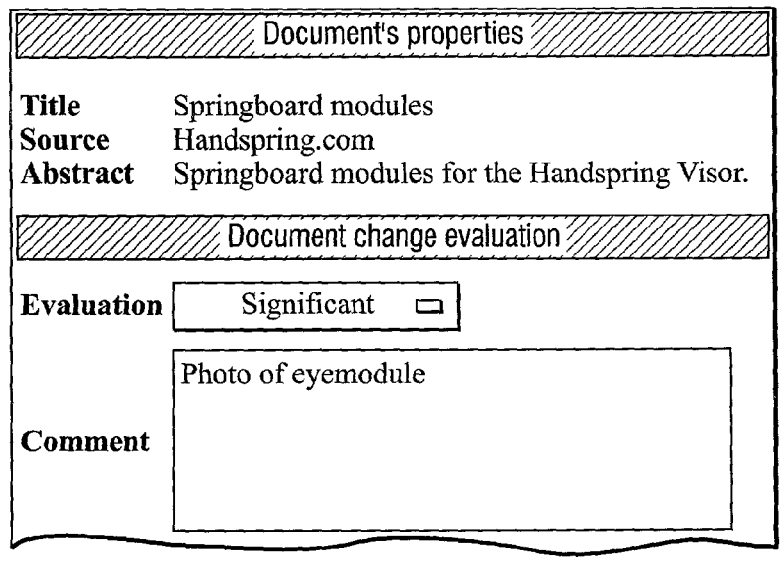
FIG. 5 shows an example of a user interface for providing an evaluation of a monitored changed page according to the present invention.

As mentioned above, according to the present invention, an additional user interface is provided. As shown in FIG. 5, the user evaluation interface provides an input field called "evaluation" so that members can then evaluate the nature of the change on a 3-point scale, currently: "negligible," "significant," or "important". Naturally, a different scale may be used if so desired. Advantageously, a further input field may be provided, as also shown, allowing users to further input textual comments on the nature of the change. Because of the implementation into Knowledge Pump, these evaluations are immediately available to others monitoring the same URL.

The user evaluations are used to construct the version history, i.e. to decide on the saving (moving from the temporary cache to the system storage) of the document or not. Currently the latest five versions considered to represent "significant" or "important" changes are saved by the system. The comments and evaluations are saved as well. In addition, the five otherwise most recent versions are saved. In all up to 10 versions of the document are saved, along with agent and user evaluations.

In fact, the system saves the five most-recent changes to a document, irrespective of their significance, as well as the five most important changes that occurred earlier and have been evaluated as such by the users. Thus, after a document has undergone at least 10 changes, the system will always have exactly 10 versions of it. The main difference with a conventional document monitoring agent is that the five less-recent changes need not be significant or important in the conventional agent, whereas they are always significant, from the user's evaluations point of view, in the system of the present invention.

Furthermore, when the $11^{th}$ changed version of a document arrives, the system decides which one to keep among the five most-recent ones.

In fact, by storing these five most-recent versions of a changed document, users will have the time to evaluate the change.

Preferably, in the system according to the present invention, the agent computed significance rating stands in for the user evaluation until at least one user has evaluated a change. From then on the agent's evaluation is disregarded and the user evaluation is used to decide on the saving of the document or not.

Figure 6:
FIG. 6 shows an example of a document history listing provided by the monitoring agent according to the present invention.

The document revision history is made available to members of KP, via a "document history" window by way of appropriate user informing means. Such informing means are well known in the art and can, e.g., be software-implemented in the system. An example is shown in FIG. 6. As can be seen in this Figure, the history listing shows the user evaluation—e.g. who, when, what—and possibly also the system's monitoring agent's "evaluation".

As mentioned above, several ways are known for determining the overall relevance of the user evaluation. By combining the evaluations from several users, a more precise indication on the relevance of the document change will be obtained. Thus, thanks to the collaborative document versioning, an even more efficient document monitoring agent is obtained.

Indeed, the decision to save a monitored page or not is taken based on user feedback, input by way of the user evaluation means, so that a more efficient storage is obtained while at the same time reducing the risk of discarding information important to the users which would have been discarded by a conventional monitoring agent, with or without a recommender system, as shown in FIG. 6. As can be seen, the listing basically only shows stored documents, i.e. those documents for which the changes are considered sufficiently interesting by the users for saving a copy of the document.

Although the implementation described is constructed on top of KP, it may be readily understood that the invention could also be implemented on top of a conventional document monitoring systems, such as the above-mentioned Webspector, so as to provide a mechanism for users to evaluate the change and use these change evaluations in a way similar to described above.

Figure 7:
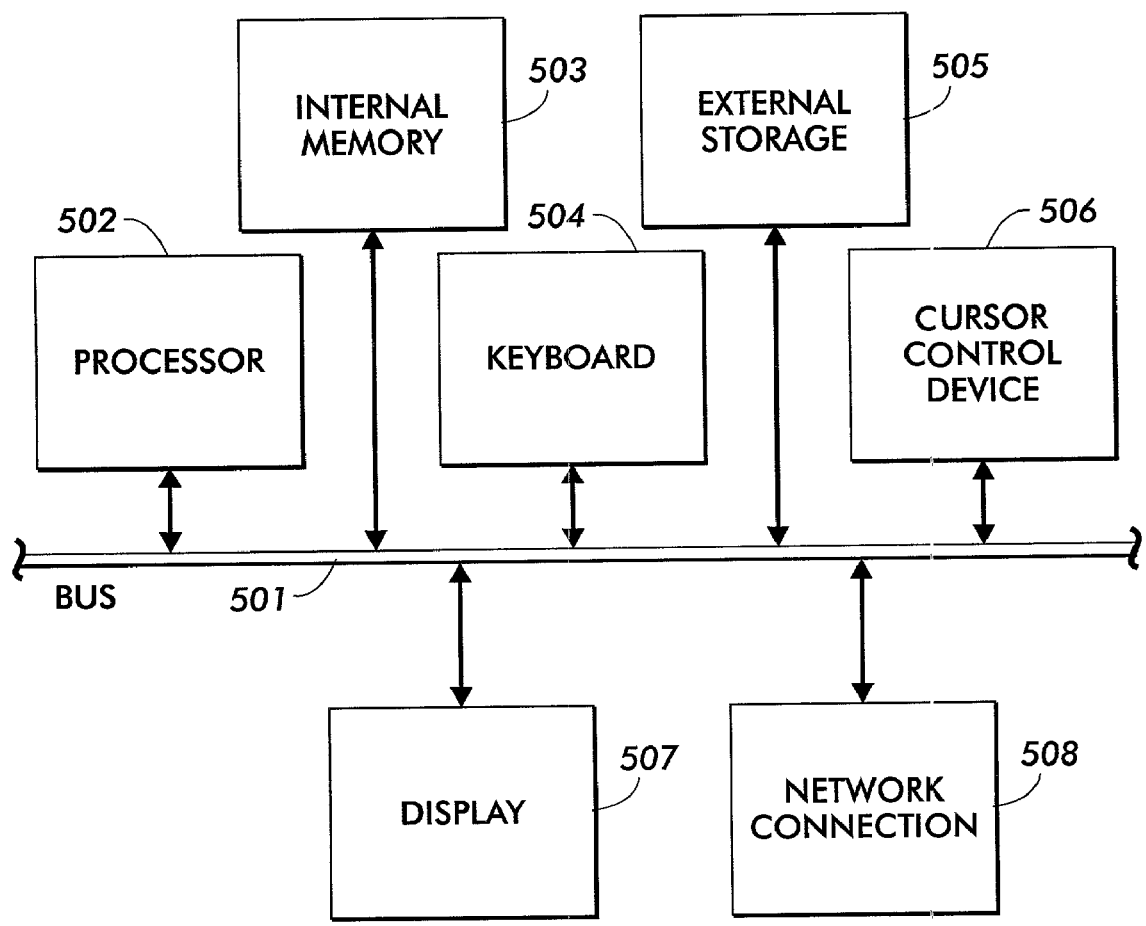
FIG. 7 is a block diagram of a computer system that may be used to implement the monitoring agent according to the present invention.

A computer-based system on which the preferred embodiment of the present invention may be implemented is described with reference to FIG. 7. Indeed, the present invention may be implemented using software-programming instructions for execution on a computer-based system. The computer-based system and associated operating instructions (e.g. software) embody circuitry used to implement the present invention. Referring to FIG. 7, the computer-based system is comprised of a plurality of components coupled via a bus 501. The bus 501 may consist of a plurality of parallel buses (e.g. address, data and status buses) as well as a hierarchy of buses (e.g. a processor bus, a local bus and an I/O bus). In any event, the computer system is further comprised of a processor 502 for executing instructions provided via bus 501 from Internal memory 503 (note that the Internal memory 503 is typically a combination of Random Access and Read Only Memories). The processor 502 will be used to perform various operations in support extracting raw data from Web site, converting the raw data into the desired feature vectors and topology, usage path and text similarity matrices, categorization and spreading activation. Instructions for performing such operations are retrieved from Internal memory 503. The operations would typically be provided in the form of coded instructions in a suitable programming language using well-known programming techniques. The processor 502 and Internal memory 503 may be discrete components or a single integrated device such as an Application Specification Integrated Circuit (ASIC) chip.

Also coupled to the bus 501 are a keyboard 504 for entering alphanumeric input, such as the evaluation of the user and possibly also comments relating to this evaluation, external storage 505 for storing data, a cursor control device 506 for manipulating a cursor, a display 507 for displaying visual output, such as the revision history listing, and a network connection 508. The keyboard 504 would typically be a standard QWERTY keyboard but may also be telephone like keypad. The external storage 505 may be fixed or removable magnetic or optical disk drive. The cursor control device 506, e.g. a mouse or trackball, will typically have a button or switch associated with it to which the performance of certain functions can be programmed. The network connection 508 provides means for attaching to a network, e.g. a Local Area Network (LAN) card or modem card with appropriate software. The network ultimately attached to is the Internet, but it may be through proxy servers or intermediary networks or dial-up services such as America On-Line™, Prodigy™ or CompuServe™.

The further description of features of the invention set forth in "Collaborative Document Monitoring", by Glance et al., in Proceedings of GROUP2001, Boulder, Colo., ACM Press, October 2001, is incorporated herein by reference.

Having described a preferred embodiment of this invention, it will now be apparent to one of skill in the art that other embodiments incorporating its concept may be used. It is felt, therefore, that this invention should not be limited to the disclosed embodiment, but rather should be limited only by the scope of the appended claims.

What is claimed is:

1. A system for providing document change information to at least one user and for saving a changed document, comprising:

document representation storage, for storing representations of saved changed documents;

a document registration element for enabling a user to identify documents for which they would like to be notified of changes;

a document change monitoring element coupled to said document registration element, said document change monitoring element for detecting a change to said document and evaluating whether said change is significant for user's evaluation;

a user notification element coupled to said document change monitoring element, said user notification element for notifying users of said change; and a user evaluation interface for enabling a user to indicate the significance of said notified change, wherein said system is arranged to store a predetermined number of changed versions of documents in said document representation storage based on said user's indication of significance, and said document representation storage further storing a first predetermined number of most recently changed versions of documents irrespective of said document change monitoring element's and user's indication of significance and storing a second predetermined number of versions of documents based upon at least one of said document change monitoring element's indication of significance and a user's indication of significance, wherein versions of documents stored in a first set including the first predetermined number of most recently changed versions of documents are subsequently stored in a second set including the second predetermined number of versions of documents based upon at least one of said document change monitoring element's indication of significance and a user's indication of significance.

2. The system as recited in claim 1, wherein said system is arranged to store a copy of said changed version of document in said document representation storage as a function of a plurality of users' indications of significance of said notified change.

3. The system as recited in claim 2, wherein said changed version of document is stored as a function of the maximum indication provided by said plurality of users' indications.

4. The system as recited in claim 2, wherein said changed version of document is stored as a function of the weighted sum of the indication provided by said plurality of users.

5. The system as recited in claim 4, wherein said changed version of document is stored when said weighted sum exceeds a predetermined threshold value.

6. The system as recited in claim 2, wherein said system uses collaborative filtering techniques for deciding to store said changed version of document.

7. The system as recited in claim 1, wherein said document representation storage stores a complete version of said changed document.

8. The system as recited in claim 1, wherein said user evaluation interface provides a plurality of predetermined values for indicating said significance.

9. The system as recited in claim 1, wherein said indication of significance is used to construct a revision history listing of the changed versions of documents stored in said document representation storage, said system further comprising user informing means for making said listing available to a user.

10. The system as recited in claim 2, wherein said indications of significance are used to construct a revision history listing of the changed versions of documents stored in said document representation storage, said system further comprising user informing means for making said listing available to said plurality of users.

11. A method for storing in a system a changed document in network-accessible documents, accessible to users of the system, the system including
a network for accessing a set of network-accessible documents; and
user notification data indicating, for each of a subset of the network-accessible documents, one or more users to be notified when a change in the network-accessible document is detected;
the method comprising:
(a) using the network to automatically attempt to access one of the network-accessible documents in the subset and to detect whether the accessed document has changed or not;
(b) evaluating whether said change should be notified to users;
(c) notifying said users indicated for the network-accessible document by the user notification data that the network-accessible document is changed if said change is determined to be significant;
(d) receiving an evaluation of the changed network-accessible document from each notified user, each user providing an evaluation value selectable from a plurality of predetermined values;
(e) in response to the received evaluation, deciding whether said changed document should be stored in said system; and
(f) storing a first predetermined number of most recently changed versions of documents irrespective of said system's and users' evaluation and storing a second predetermined number of versions of documents based upon at least one of said system's and users' evaluation,
wherein versions of documents stored in a first set including the first predetermined number of most recently changed versions of documents are subsequently stored in a second set including the second predetermined number of versions of documents based upon at least one of said system's and users' evaluation.

12. The method as recited in claim 11, wherein the decision to store said changed document is based on a plurality of users' evaluations.

13. The method as recited in claim 12, wherein the decision to store said changed document is based on the maximum value amongst said users' evaluations.

14. The method as recited in claim 12, wherein the decision to store said changed document is based on a weighted sum of the users' evaluations.

15. The method as recited in claim 14, wherein said changed document is stored when said weighted sum exceeds a predetermined threshold value.

16. The method as recited in claim 11, wherein said user' evaluations are used to construct a revision history listing of the changed documents stored in said system, said method further displaying said listing to each user.

17. The method as recited in claim 11, further receiving user' comments relating to said user evaluations.

* * * * *